Oct. 16, 1934.  M. L. HANAHAN  1,977,583
METHOD OF PRODUCING ZINC SULPHIDE PIGMENTS AND PRODUCT THEREOF
Filed April 22, 1931
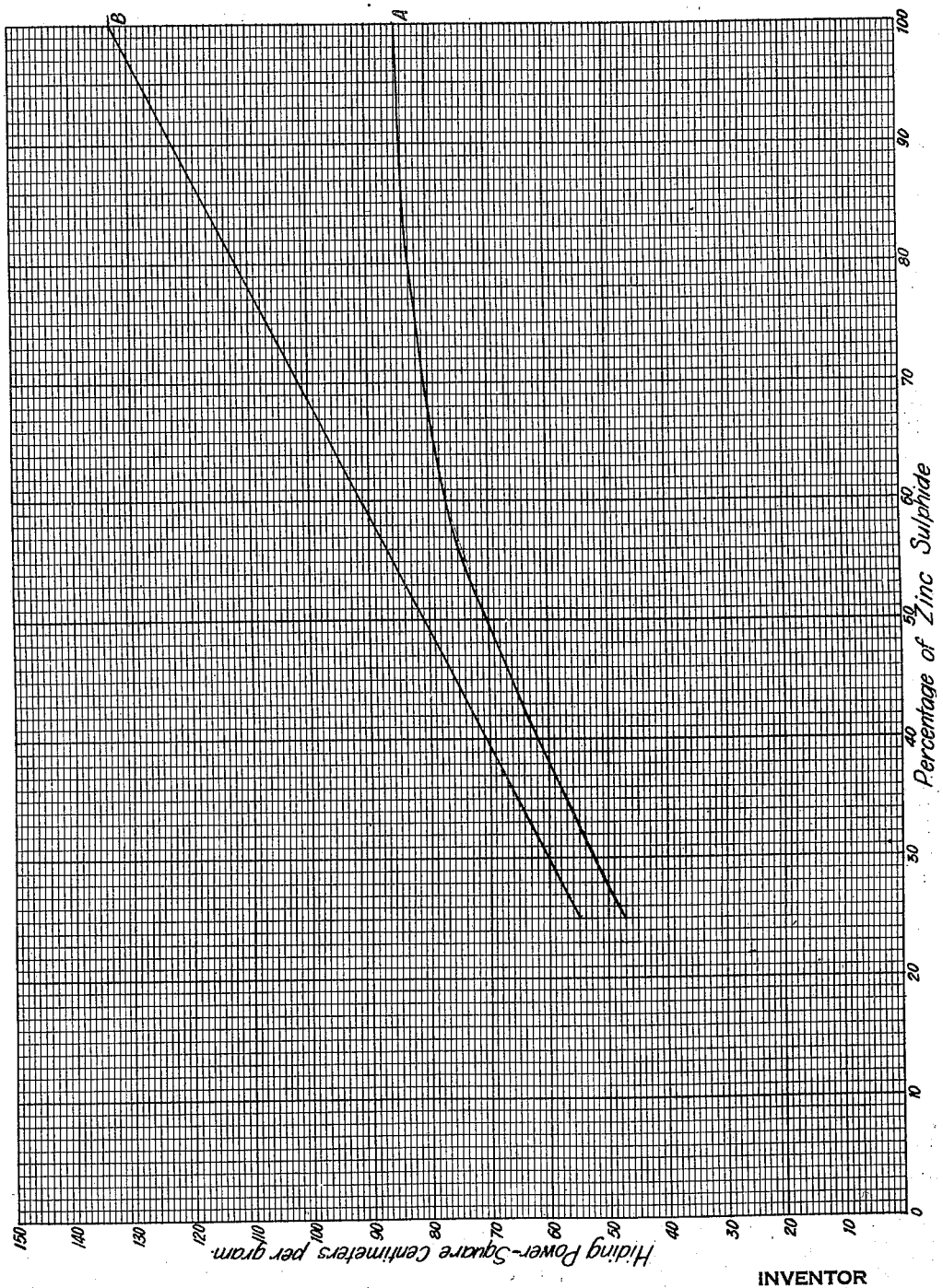
INVENTOR
Marion L. Hanahan
BY
ATTORNEYS Patented Oct. 16, 1934

1,977,583

UNITED STATES PATENT OFFICE 1,977,583

METHOD OF PRODUCING ZINC SULPHIDE PIGMENTS AND PRODUCT THEREOF

Marion L. Hanahan, East Orange, N. J., assignor, by mesne assignments, to Krebs Pigment & Color Corporation, Wilmington, Del., a corporation of Delaware Application April 22, 1931, Serial No. 531,946

24 Claims. (Cl. 134—78)

When preparing a pigment comprising zinc sulphide formed by precipitation from a soluble zinc salt solution, and then treating the precipitate at high temperatures and pressures in the presence of moisture, there is a difference in effect as compared with the usual calcination process, not only as regards the physical nature of the product but also to a more limited extent, as regards its chemical composition. This is perhaps due to the fact that in case of heat and pressure, there is little chance for evolution of substances which are ordinarily volatilized during calcination.

I have discovered that when a zinc sulphide pigment is to be given a treatment by autoclaving at high temperatures under high pressures, the pigmenting nature of the product is greatly modified if the chemical composition of the aqueous suspension, or slurry, to be autoclaved is kept within a closely restricted range of composition. This applies not only to the presence in the slurry of excess zinc or sulphide components but also to other substances which may have some action, perhaps catalytic, to prevent the development of the proper pigmenting properties in the material. Thus I have found that soluble barium salts must be carefully avoided, whereas, in the ordinary calcination process an excess of soluble barium apparently does no harm. On the other hand, chlorine seems to have but little effect so that I am not restricted to the use of pure zinc sulphate but can use solutions comprising very substantial quantities of zinc chloride, and which may contain other chlorides without interfering with the result.

I have further found that if the maximum strength of pigment is to be obtained, the relationship between the zinc and sulphide components in the material, as subjected to autoclaving, must be brought within far closer limits than has been required for the usual calcination process and that these limits are within a range which cannot, by methods now available, be met by analytical methods applied directly to the raw pigment slurry. This difficulty may, however, be met by taking a sample of the slurry and autoclaving this sample, after which an analysis can be made quite accurately. On the basis of this analysis the body of the slurry can be adjusted to the required close limits so that when the adjusted slurry is autoclaved a product is produced definitely superior as regards pigmenting strength to any similar products which have heretofore been made.

In the following description, I allude primarily to the preparation of lithopone by the interaction of zinc sulphate and barium sulphide, but it is to be understood that my invention can be utilized with other soluble sulphides which may replace the barium sulphide in whole or in part, or that other salts of zinc may be used.

In carrying out the process, I may use a rather strong zinc sulphate liquor such for example as one of about 35° Bé. strength, but I may also use zinc sulphate solutions within a wide range of concentrations, with or without other soluble zinc salts. The solution preferably should show a point color drop of not more than about 1.5 which, roughly speaking means that there are not present more than approximately 1.5 parts per million of heavy metals, such as copper, nickel, iron, etc., which will form dark colored sulphides.

If barium sulphide is used as a precipitating agent, I may use a solution of the usual strength such for example as from 15° Bé. to 35° Bé. though other strengths may be used. The usual light colored barium sulphide solutions may be employed.

In making the precipitation or strike I prefer to run the zinc liquor slowly into the sulphide liquor, as for example, over the course of an hour with agitation taking place. The precipitation is preferably kept hot so that the soluble sulphides will remain in the solution. Of course, if relatively weak solutions are being used, the heat will not be as important. In making the strike the preferred end point is when there is no excess of sulphide, but there should be no large excess of zinc, which would be present as the oxide or sulphate, depending upon the acidity. If the end point of the strike is such that there is an excess of sulphide, there is danger that oxidation products will be formed during washing, but if means are provided for preventing the formation of such oxidation products, the strike can be ended with the sulphide in slight excess.

In making an adjustment of the precipitate there are three primary characteristics of the finished pigment that must be considered, namely, light stability (i. e. resistance to darkening in sunlight), brightness or color, and the pigmenting strength or hiding power.

As regards light stability, I have discovered that when operating as herein set forth, the presence of chlorine in the strike has no appreciable effect. Heretofore when lithopone or other zinc sulphide pigment has been prepared by calcination, the chlorine content of the strike has been considered one of the most important factors and it has been considered essential that the chlorine be kept very low, as below 2 grams of chlorine per liter of 20° Bé. zinc sulphate solution. This has somewhat restricted the types of soluble zinc compounds that can be used and has increased the cost of the finished product, so that the fact that the chlorine content can be disregarded as a factor of considerable commercial importance. I have found that while the chlorine content is unimportant there is one important feature affecting the light stability, and this is the relationship of the sulphide ions to the zinc ions in the material at the time of autoclaving. Thus the light stability is excellent (that is the pigment shows no appreciable darkening in the sunlight) if the precipitate is adjusted to show an excess of sulphide or at most only a very slight excess of zinc. I have found that working with commercially purified zinc liquors, the light stability begins to fall off if the sulphide content is reduced to the point where there is more than .1% true excess of zinc, computed as the oxide, but reasonably satisfactory results can be obtained beyond this point. For example, the sulphide may be reduced to the point where the zinc is present in an excess ranging up to .15%. If a light stabilizing agent such as cobalt is present these figures may be exceeded. On the sulphide side, for commercial reasons the excess sulphide should not exceed about 3%, though chemically this figure is unimportant, as regards light stability. It follows as a matter of course that where the slurry is adjusted, in the manner set forth hereafter, to show not more than .15% excess of zinc computed as the oxide, then the product after the heat treatment will contain not more than .15% of zinc oxide, the balance of the zinc being present in the form of sulphide.

In considering the question of color or brightness, the principal point to consider is contamination. Working in the laboratory with pure reagents, an excellent color can be obtained if the slurry is treated on the sulphide side, but in commercial practice and using commercial equipment I find that if an excess of sulphide is present some formation of iron or related metal sulphide will almost invariably occur to contaminate the final product. This form of contamination is avoided if the slurry is adjusted before autoclaving to show a true excess of zinc, and in considering the matter from the point of view of color alone, this excess can be as great as desired. I have further found that this excess does not need to be present during the entire time that the slurry is being autoclaved, for if the precipitate is prepared on the sulphide side and the heat treatment largely completed under these conditions so that there is good light stability, and then an excess of zinc is added and the autoclaving continued a short time, the heavy metals will be displaced and the desired brightness obtained. In other words, irrespective of the way the precipitate is first adjusted, if the autoclaving is finished with an excess of zinc present and commercially purified zinc liquors have been used, I can regularly and consistently obtain a pigment which when made into a paint in the manner hereinafter described will show a brightness of above 85%, as for example 88% or higher, before being adjusted to the standard brightness. In the strength tests hereinafter referred to, colors are added to the pigment in the manner well understood in the art to bring it down to a standardized brightness of 85%. It is possible that the necessity of finishing on the zinc side can be avoided by taking proper precautions to prevent contamination as by using tantulum lined equipment. Summing up the two considerations thus far discussed, we see that for light stability we should either have an excess of sulphide or a very slight excess of zinc, whereas for color, the treatment should be completed with the precipitate on the zinc side. For each of these factors permissible ranges are relatively broad.

When it comes to the question of pigmenting strength I find that if something approaching maximum is desired, the final adjustment must be made much finer than for either light stability or brightness and must be made with such accuracy that the finished product will show a definite composition within very close limits. I further find that an anlysis of the slurry even after washing will not ordinarily give its true composition with sufficient accuracy so that the proper adjustment can be made to give a product within the required limits for maximum strength. This difficulty is probably due to the fact that a certain amount of the zinc is held adsorbed within the precipitate so that there may be an excess of zinc present even though by present analytical methods the slurry shows free sulphide; in other words, the reaction is not complete even when the precipitation is carried on at the boiling temperature. By the usual analytical methods it is difficult, if not impossible, to ascertain both the amount of unreacted zinc and unreacted sulphide which are present.

If the slurry is subjected to high temperatures under pressure, as for example a temperature ranging upward from 200° C. and a pressure above 215 pounds, the reaction continues on substantially to completion, and after such autoclaving treatment the chemical composition can be determined with great accuracy. However, it is essential, in order to obtain the desired results, that the adjustment on the material be made in advance of such autoclaving treatment. Accordingly, I have found that after the precipitate is formed and washed, a representative sample of the slurry should be taken and subjected to high temperatures and pressures in approximately the same manner that is planned for the entire batch. This sample can then be analyzed and the amount of additional ingredients that need be added can be calculated with great accuracy to bring the final results within a very close range of limits. It may be that some analytical method can be worked out for determining accurately the composition of the slurry without this step of subjecting a sample of the slurry to the autoclaving test, therefrom adjusting the whole batch, autoclaving it and obtaining a product of the same nature as that which I obtain, but at the present time the procedure outlined is the best which I have discovered.

In determining the adjustment of the slurry, the first point to consider is that if barium sulphide has been used, the slurry must be adjusted so that there is no soluble barium; in other words, in the case of lithopone the slurry should be adjusted to show a slight excess of sulphate ion. Such sulphate may for example be present in the form of sodium sulphate, permitting a substantial excess of the sulphate ion while holding the zinc within very close limits, though more than about 2% sodium sulphate may be detrimental to the pigmenting properties of the final product.

As regards the zinc and sulphide ions, when considering strength alone I find that it is permissible to have either a very slight excess of zinc or a very slight excess of sulphide. However, as already stated, if the adjustment is brought to the sulphide side there is a danger of contamination by the formation of heavy metal sulphides such as iron sulphide while the subsequent addition of zinc ordinarily will add substantially to the cost. For this reason the autoclaving is preferably conducted with the slurry maintained slightly on the zinc side.

When working on the zinc side, the slurry should be adjusted so that after autoclaving there will be an excess of not substantially more than 0.1% true excess of zinc calculated as oxide and based on the dry content of solids, and preferably this figure should not exceed .05%. Ordinarily, it will be found that the slurry has an excess of zinc greater than desired so that it is necessary to add additonal sulphide for the adjustment and at this time either barium sulphide or sodium sulphide or other soluble sulphides may be used. After the adjustment I have found that the pH value before autoclaving should be about 9.5 to 10. Due to the reaction that will ordinarily take place during autoclaving between the sodium sulphide and adsorbed basic zinc compounds sodium hydroxide is formed, and the pH value may rise to 11 or 12.

If the slurry is to be kept slightly on the sulphide side for the greater part of the autoclaving and then adjusted to give a slight excess of zinc, and further autoclaved for a short time, as from three to five minutes, the necessary amount of zinc sulphate or other zinc compound can be determined from a test run, and this can be injected into the autoclave during the last portion of the treatment. When operating in this way, the slurry should be adjusted to show not more than about .15% true excess sulphide calculated as sodium sulphide and based on the dry content of solids, and preferably not more than .075%. Irrespective of whether the slurry is adjusted to the zinc side or first adjusted to the sulphide side with a subsequent addition of a slight excess of zinc it will be seen that when working within the ranges given for good strength one will also obtain a pigment which will not substantially darken when exposed to sunlight and which will show a brightness of at least 85% as stated. If brightness is not a vital factor light stability will be obtained when operating on the sulphide side within the limits given for good strength.

After the slurry has been properly adjusted, it is subjected to the simultaneous action of heat and pressure in the presence of moisture both to complete the reaction and to give the proper pigmenting qualities. This operation may for example be carried out in a continuous process such as is set forth in my co-pending application Serial No. 531,945 filed April 22, 1931 in which case the precipitate may be maintained in the form of a slurry containing for example between 1 and 3 parts of water to one part of pigment, though other proportions may be used if desired. If preferred, the material may be autoclaved in a batch operation, in which case it will not be necessary to use such a large amount of water.

During the autoclaving, the material should be heated to a temperature of between 200° and 500° C. or more and the pressure may range from 215 pounds to in excess of 6000 pounds. The top limit of pressure apparently is simply determined by the cost of the apparatus. I have found that a preferred range of temperature is between 310° and 370° C. and excellent results have been obtained at about 340° C. plus or minus 10 degrees, with the pressure at least as great as the corresponding pressure of saturated steam. The autoclaving will ordinarily last between about 10 and 60 minutes, though this time may range from about 5 minutes upward to several hours, depending upon the temperatures and pressures used. By heat treating the slurry under these conditions, in addition to other advantages, all danger of sintering is avoided so that the pigment immediately after such heat treatment is smooth and soft and free from gritty particles, and is of a particle size rendering it available for use in paints and the like.

For the purposes of this process, I may produce the zinc sulphide from a basic zinc compound or from any soluble salt of zinc, though as a practical matter the salts economically available are the sulphate and chloride. In the same way, any soluble sulphide may be used, of which the commonest for this purpose are barium and sodium sulphide. However, other sulphides may be employed such as hydrogen sulphide or calcium hydrosulphide which latter may be used either in the proportion of one mol of calcium hydrosulphide with two mols of the zinc compound, with neutralization of the free acid when necessary; or in equal molecular proportions with removal of the excess hydrogen sulphide. Thus in addition to barium lithopones, can produce other lithopones such as calcium lithopone, or straight zinc sulphide. In all such cases the precipitate, after washing, should be adjusted with a zinc compound and a soluble sulphide following the procedure outlined above.

It is well known that with a pigment consisting of zinc sulphide co-precipitated with an extender and finished by the usual methods of calcination, the hiding power or other pigmenting properties relating to the strength of the pigment are not directly proportional to the zinc sulphide content when the zinc sulphide is present in the proportion of 25% or more (and below that percentage the pigments are of no great commercial interest). The hiding power of the co-precipitated and calcined pigment is greater than would be expected considering the separate pigmenting values of the separate ingredients, but the added value obtained by increasing the zinc sulphide percentage drops off quite rapidly.

For the purpose of illustration, I show in the attached drawing, curves giving varying hiding powers in relation to the zinc sulphide content of pigments made by my process and by the usual calcination process. In the drawing, curve A represents hiding power or strength of pigments obtained by the co-precipitation of zinc sulphide and barium sulphate finished by calcination, the abscissa representing the percentage of zinc sulphide and the ordinate representing the hiding power as hereafter defined at 85% brightness. It may be noted that above about 70% the increases of zinc sulphide content give relatively little increase in hiding power. Thus the highest hiding power value which I have ever found for calcined zinc sulphide and which I believe to be approximately the maximum obtainable by the calcination process is about 85; for a 55% zinc sulphide-45% barium sulphate co-precipitated and calcined lithopone the maximum hiding power value is about 75, and for a normal lithopone the maximum value is about 51.

In plotting a similar curve for the hiding power of zinc sulphide co-precipitated with an extender such as barium sulphate or calcium sulphate, made and finished according to my invention, it is found that, for zinc sulphide values above 25%, the curve is substantially a straight line, showing increases in hiding power directly proportional to increases in the percentage of zinc sulphide. Thus in the drawing, I show at B, a curve for a zinc sulphide-barium sulphate pigment made and finished according to my process. This curve represents values which can be met or exceeded with commercial regularity when operating according to my invention. This curve can be expressed, for values of zinc sulphide from 25% to 100%, by the formula:

Hiding Power = 55 + 1.04 (percent ZnS − 25)

Thus in actual operations I have obtained the following values given as typical examples: 95% zinc sulphide—5% barium sulphate, hiding power=136; 40.5% zinc sulphide—58.5% barium sulphate, h'ding power=77; normal lithopone of 28.5% zinc sulphide, hiding power=62. From this it appears that by my process I have produced zinc sulphide in a distinctly new physical form.

The hiding power value used in the foregoing description of my product is determined in a manner described by Dr. A. H. Pfund in the Journal of the Franklin Institute for November, 1919, page 676 and for July, 1923, page 69.

These determinations are carried out as follows:

First a paint of standard composition is produced from the pigment and brought to a predetermined brightness. Then by means of an instrument known as a cryptometer the thickness of the film necessary to give complete hiding is determined. From this the number of square centimeters which one gram of pigment will hide is calculated.

In order to show exactly how the figures used above were determined, I will give an outline of my procedure so that the same may be duplicated:

The pigment was ground with oil to form a paint of the following composition by weight:

| | Per cent |
|---|---|
| Pigment | 54.23 |
| Enamel blending oil (A) | 44.67 |
| Drier (B) | 1.10 |

The following is a specification of enamel blending oil (A) used:

| | Pounds |
|---|---|
| Alkali refined linseed oil | 661.3 |
| China-wood oil | 117.5 |
| Cobalt linoleate gum | 3.0 |
| Mineral spirits | 327.5 |
| Total | 1109.3 |
| Loss | 26.4 |
| Yield | 1082.9 |

*Cooking directions*

Run oils to 580–585° F. Hold for two to two and one half hours to a standard body. Cool to 300° F. Add cobalt linoleate gum. Let stand over night and reduce. Not centrifugated but must be free from dirt and skins.

*Specifications*

| | |
|---|---|
| Color | 4+or−1 (on the Gardner Holt scale) |
| Consistency | E+or−½ (on the Gardner Holt scale) |
| Specific gravity | 0.903 |
| Gallon weight | 7.52 lbs.+or−0.04 lbs. |

The drier (B) had the following composition:

| | Per cent |
|---|---|
| Linseed oil | 62.2 |
| Lead | 12.85 |
| Manganese | .21 |
| Volatile thinner | 24.74 |

In making up the test paint a paint base was first made by grinding 509 grams of the pigment with 191 grams of the oil (A) on a 3-roll ink mill. This was passed twice through the mill to insure uniform mixing. The base thus prepared was then reduced with a further addition of oil (A) containing the drier (B), these ingredients being combined in the following proportions:

| | Grams |
|---|---|
| Paint base | 596.7 |
| Oil (A) | 194.5 |
| Drier (B) | 8.8 |

After the paint was thus prepared, it was brought to a brightness of 85% of the incident light, substantially uniform throughout the range of visible wave lengths. The paint thus prepared was tested in the cryptometer, taking a number of readings in each case for the sake of additional precision, and in operating the cryptometer a constant source of illumination was used in the viewing device. This consisted of a standard 50 watt tungsten filament lamp located 20 centimeters above and to the left of the cryptometer and screened from the observer's eyes.

From the thickness of the film necessary for complete hiding, and from the concentration of pigment in the test sample of paint, the number of square centimeters which one gram of the pigment would hide was calculated as set forth in Dr. Pfund's articles, and the figure thus obtained was used as the hiding power.

If one desires to test the hiding power of a pigment having a maximum brightness of less than 85%, in order to see whether its hiding power equals the figures given above, this can be done by making up a test sample according to my process which meets the above tests and of approximately the same composition as the material under observation, and then reducing the brightness of such test sample to equal that of the given pigment, and comparing the hiding power of the two.

This application contains matter derived from my earlier application Ser. No. 409,294, filed November 23, 1929, of which case this application is a continuation in part.

In order to ascertain what are the physical characteristics of pigments made in accordance with my process which give to the product its novel and advantageous hiding power, a study has been made of the particle size of the material as compared with the particle size involved in the case of ordinary calcined pigments, and a further study has been made to ascertain the theoretical maximum hiding power in terms of particle size.

The method used for the determination of particle size is an application of the supercentrifuge. This procedure was originally developed in Svedberg's laboratory and is discussed in its various aspects in the following references: Svedberg & Rinde, J. Am. Chem. Soc. 46, 2683 (1924); Nichols & Liebe—3rd Colloid Symposium 1925 page 283; Svedberg & Nichols J. Am. Chem. Soc. 49, 2926 (1927); Svedberg & Heyroth J. Am. Chem. Soc. 51, 552, (1929).

The procedure may be described briefly as follows: The lithopone is dispersed in a glycerine solution without grinding and this suspension is placed in the centrifuge cell. The cell, with transparent walls, is located in the rotor of an ultra-centrifuge capable of rotating at a speed of 2400–4800 R. P. M. The system is so arranged that a beam of light can be passed through the cell during its rotation and photographs taken of the level of the pigment particles in suspension in the glycerine solution. The rate at which sedimentation occurs during rotation at a given speed is determined, of course, by the particle size of the suspended pigment. From the photographs taken during different periods of rotation the distribution of particle size can be calculated by known methods covered in the reference cited above.

This procedure is applicable both to pigments consisting essentially of pure zinc sulphide and also to those containing both zinc sulphide and barium sulphate, but in the latter case if it is desired to determine the particle size of each component separately it is necessary first to remove the other component by chemical treatment. The removal of the zinc sulphide component can readily be carried out by treatment of the lithopone with dilute acid of sufficient concentration to dissolve the zinc sulphide but leave the barium sulphate unaffected. It has been proved that this treatment does not alter the particle size distribution of the barium sulphate component. Similarly, if it is desired to remove the barium sulphate, this can be done by boiling with a concentrated solution of sodium carbonate and removing the barium carbonate so produced by use of a very weak acid. It is necessary to repeat this treatment several times for complete removal of the barium sulphate.

Following this procedure it is found that the zinc sulphide pigments produced in accordance with the process herein described are distinguished by great uniformity of particle size which is not only true of the zince sulphide alone but, in the case of lithopones, is also true of the barium sulphate. This uniformity of particle size very probably results from the uniform conditions of treatment which are possible in this process. Each individual particle of zinc sulphide or of barium sulphate or each composite particle of these two materials is subjected to substantially exactly the same conditions of treatment as every other particle; and is quite different from the conditions obtained in the usual calcination process where the relatively large lumps or aggregates of dried lithopone are raised to calcining temperature and then discharged into water. In the calcination treatment the outside layers of the lumps or aggregates are heated more rapidly and to a higher temperature than the cores of the lumps so that non-uniformity in the particle size of the calcined product is a necessary result. In my process, on the other hand, the temperature and conditions of treatment are identical for each particle and all particles are given equal opportunity to grow uniformly and to the same degree. Further, under the carefully controlled conditions of precipitation herein described, there is a minimum deviation in particle size prior to the heat treatment.

Reducing this matter of uniformity to positive terms, the examination shows that the particle size of the zinc sulphide made by my process will average quite close to .50 microns in diameter and certainly between about .4 microns and about .6 microns. Also it will be found that if the process is conducted carefully as directed as much as about 85% and certainly more than 75% will be found to range between .2 and .8 microns. The barium sulphate will average somewhat larger, having an average size of about .75 microns in diameter, but its uniformity will also be great, having from about 60% up to about 68% between .2 and .8 microns in diameter. This compares with a study of the best commercial lithopones made by calcination which we have been able to obtain. In the best of these it has been found that the average particle size of the zinc sulphide is .69 microns in diameter and that on the score of uniformity only about 63% falls between .2 and .8 microns in diameter. Further, in this case the barium sulphate averages .82 microns in diameter and only 45% is between .2 and .8 microns in diameter.

The figures .2 and .8 microns have been used as the measure for the percentage on these pigments because a careful examination has shown that the obscuring power of a pigment such as zinc sulphide reaches its maximum at .5 microns diameter. On either side of this best diameter the obscuring power drops away very rapidly. Thus at .3 microns it has dropped to 62% of maximum and at .2 microns to 11% of maximum. Similarly, as the particle size is increased to .7 microns the obscuring power drops to 80%, at .8 microns to about 59% and at .9 microns to about 28%. Accordingly, a material having an average size between .2 and .8 microns includes the best of the material. In other words, this examination shows that the pigment made in accordance with my process comprises zinc sulphide particles of substantially uniform size and also of barium sulphate particles, which are substantially uniform particle size, with the barium sulphate particles averaging somewhat larger than the particle size of the zinc sulphide particles, and the zinc sulphide particles averaging about .5 microns in diameter, which has been found to be the most desirable size. This uniformity, and the fact that the average is at the desired point are both factors of importance in my product and define a product which is definitely new.

What I claim is:

1. The method of preparing a pigment comprising zinc sulphide, which comprises combining a zinc compound with a solution of a soluble sulphide to form a slurry comprising zinc sulphide, submitting a sample of such slurry to a temperature above 200° C. at a pressure above 215 pounds to complete the reaction, analyzing such sample as regards excess zinc or sulphide, adjusting the remainder of the slurry to contain not more than 0.1% true excess zinc computed as zinc oxide nor more than 0.15% true excess sulphide computed as sodium sulphide, and treating such slurry at a temperature above 200° C. at a pressure above 215 pounds.

2. The method of preparing a pigment which comprises combining a zinc compound with a solution of a sulphide to form a slurry comprising zinc sulphide, determining the true excess zinc or sulphide in such slurry, adjusting the slurry to contain not more than 0.1% true excess zinc computed as zinc oxide nor more than 0.15% true excess sulphide computed as sodium sulphide and subjecting such slurry to a temperature in excess of 200° C. at a pressure above 215 pounds.

3. The method of preparing a pigment which comprises combining a zinc compound with a solution of a sulphide to form a slurry comprising zinc sulphide, determining the true excess zinc or sulphide in such slurry, adjusting the slurry to contain not more than .05% true excess zinc computed as zinc oxide, nor more than .075% true excess sulphide computed as sodium sulphide and subjecting such slurry to a temperature in excess of 200° C. at a pressure above 215 pounds.

4. The method of preparing a pigment which comprises combining a solution of a zinc salt with a solution of a sulphide to form a slurry comprising zinc sulphide, determining the excess zinc or sulphide in such slurry, adjusting the slurry to contain a true excess of zinc not exceeding 0.1% and subjecting such slurry to a temperature in excess of 200° C. at a pressure above 215 pounds.

5. The method of preparing a pigment which comprises combining a solution of a zinc salt with a solution of a sulphide to form a slurry comprising zinc sulphide, determining the excess zinc or sulphide in such slurry, adjusting the slurry to contain a true excess of zinc not exceeding .05% and subjecting such slurry to a temperature in excess of 200° C. at a pressure above 215 pounds.

6. A process as specified in claim 2, in which the slurry is first adjusted to contain an excess of sulphide, computed as sodium sulphide, not exceeding 0.15%, and after being subjected to the heat and pressure stated is readjusted to contain a true excess of zinc not exceeding 0.1% excess computed as zinc oxide and then is further subjected to such heat and pressure.

7. The method of preparing pigments which comprises combining a solution comprising zinc sulphate with a solution comprising barium sulphide to form a slurry comprising zinc sulphide and barium sulphate, adjusting such slurry to show no excess of a soluble barium compound and a true excess of zinc not exceeding 0.1%, computed as zinc oxide, and subjecting such slurry to a temperature between 200° C. and 500° C. and a pressure between 215 pounds and 6000 pounds.

8. In the manufacture of a pigment comprising zinc sulphide, the steps of causing a solution of a zinc salt to react with a solution of a sulphide to form a slurry, subjecting a sample of such slurry to a temperature above 200° C. at a pressure in excess of 215 pounds to complete the reaction, determining the excess of zinc or excess of sulphide in such treated sample, and adjusting the balance of the slurry accordingly.

9. The process of producing light staple pigments comprising zinc sulphide which comprises combining a zinc compound with a solution of a soluble sulphide to form a slurry in which the relative relationship of sulphide ions to zinc ions falls within the range comprising an excess of sulphide and not over .15% excess of zinc, and treating such slurry at a temperature above 200° C. at a pressure above 215 pounds.

10. As a new product, a pigment comprising between 25% and 100% zinc sulphide and between 75% and 0% barium sulphate characterized by the fact that it has been heat treated in the presence of a liquid at a temperature substantially above the boiling point of such liquid and at a substantially elevated pressure to give it high pigmenting strength and by the fact that it is substantially color-stable to sunlight and has a brightness as herein defined of at least 85% and which immediately after such heat treatment is free from gritty, sintered particles.

11. As a new product, a pigment comprising between 25% and 100% zinc sulphide and between 75% and 0% barium sulphate resulting from a heat treating process in which the pigment is heat-treated in the presence of a liquid at a temperature substantially above the boiling point of such liquid and at a substantially elevated pressure, and characterized by the fact that it is substantially color-stable to sunlight, has a brightness of at least 85% and has a hiding power at 85% brightness as herein defined, equal to at least $55+1.04$ (percent ZnS$-25$).

12. As a new product, a pigment comprising between 25% and 100% zinc sulphide and between 75% and 0% barium sulphate resulting from a heat treating process in which the pigment is heat-treated in the presence of a liquid at a temperature substantially above the boiling point of such liquid and at a substantially elevated pressure, and having a hiding power at least equivalent to that of a pigment of approximately similar composition which has a hiding power at 85% brightness as herein defined equal to at least $55+1.04$ (percent ZnS$-25$).

13. As a new product, a pigment consisting essentially of zinc sulphide resulting from a heat treating process in which the pigment is heat-treated in the presence of a liquid at a temperature substantially above the boiling point of such liquid and at a substantially elevated pressure, and having a hiding power at least equivalent to that of a pigment of approximately similar composition which has a hiding power at 85% brightness as herein defined of at least 133.

14. As a new product, lithopone of normal percentage ratio resulting from a heat treating process in which the pigment is heat-treated in the presence of a liquid at a temperature substantially above the boiling point of such liquid and at a substantially elevated pressure, and having a hiding power at least equivalent to that of a pigment of approximately similar composition which has a hiding power at 85% brightness as herein defined of at least 59.

15. As a new product, a pigment comprising from 40% to 42% zinc sulphide and from 58% to 60% barium sulphate resulting from a heat treating process in which the pigment is heat-treated in the presence of a liquid at a temperature substantially above the boiling point of such liquid and at a substantially elevated pressure, and having a hiding power at least equivalent to that of a pigment of approximately similar composition which has a hiding power at 85% brightness as herein defined of at least 71.

16. A finished opaque lithopone paint pigment which has been steam treated without calcination at a temperature below 500° C. and which has a zinc oxide content as developed through said steam treatment greater than zero but less than 0.15%.

17. As a new article of manufacture a finished opaque paint pigment comprising zinc sulphide in which the average particle size is between 0.2 and 0.8 microns diameter and 75% of the zinc sulphide particles are within the range of particle size between 0.2 and 0.8 microns diameter.

18. As a new article of manufacture, a finished opaque paint pigment comprising zinc sulphide in which the average particle size of the zinc sulphide is between about .4 and about .6 mircons in diameter and at least 75% of such particles are between .2 and .8 microns in diameter.

19. As a new article of manufacture, a finished opaque paint pigment of substantially uniform particle size characteristics comprising zinc sulfide in which at least 75% of the zinc sulfide consists of particles within the range of particle sizes between 0.2 and 0.8 microns diameter.

20. As a new article of manufacture, a finished opaque paint pigment of substantially uniform particle size characteristics comprising zinc sulfide in which at least 75% of the zinc sulfide consists of particles within the range of particle sizes between 0.4 and 0.6 microns diameter.

21. As a new article of manufacture, a finished opaque paint pigment of substantially uniform particle size characteristics comprising zinc sulfide in which the average particle size is between 0.2 and 0.8 microns diameter and at least 75% of the zinc sulfide consists of particles within the range of particle sizes between 0.2 and 0.8 microns diameter.

22. As a new article of manufacture, a finished opaque lithopone paint pigment in which the zinc sulfide is of substantially uniform particle size and at least 75% of the zinc sulfide consists of particles within the range of particle sizes between 0.2 and 0.8 microns diameter and in which the barium sulfate is of substantially uniform particle size and at least 60% of the barium sulfate consists of particles within the range of particle sizes between 0.2 and 0.8 microns diameter.

23. As a new article of manufacture a finished opaque lithopone paint pigment in which the average particle size is between 0.2 and 0.8 microns diameter, in which the zinc sulfide is of substantially uniform particle size, and at least 75% of the zinc sulfide consists of particles within the range of particles sizes between 0.2 and 0.8 microns diameter and in which the barium sulfate is of substantially uniform particle size and at least 60% of the barium sulfate consists of particles within the range of particle sizes between 0.2 and 0.8 microns diameter.

24. As a new article of manufacture a finished opaque lithopone paint pigment in which the zinc sulfide is of substantialy uniform particle size and at least 75% of the zinc sulfide consists of particles within the range of particle sizes between 0.4 and 0.6 microns diameter and in which the barium sulfate is of substantially uniform particle size and at least 60% of the barium sulfate consists of particles within the range of particle sizes between 0.2 and 0.8 microns diameter.

MARION L. HANAHAN.